Dec. 26, 1961 E. F. NOYES 3,014,558
SHELTER STRUCTURE
Filed Jan. 30, 1961 7 Sheets-Sheet 1

INVENTOR.
ELIOT F. NOYES
BY
ATTORNEY.

Dec. 26, 1961  E. F. NOYES  3,014,558
SHELTER STRUCTURE
Filed Jan. 30, 1961  7 Sheets-Sheet 2

INVENTOR.
ELIOT F. NOYES
BY
ATTORNEY.

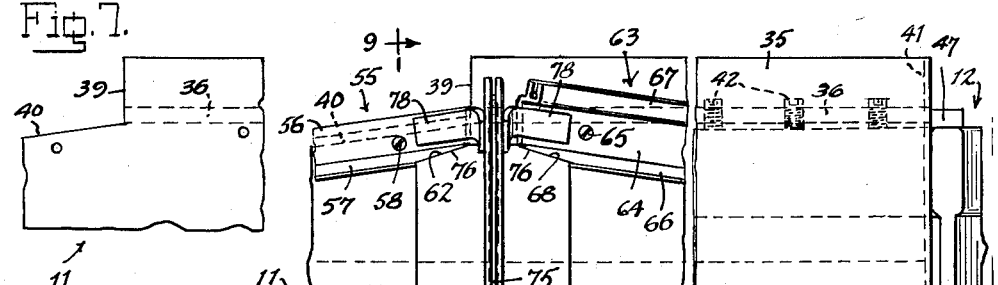

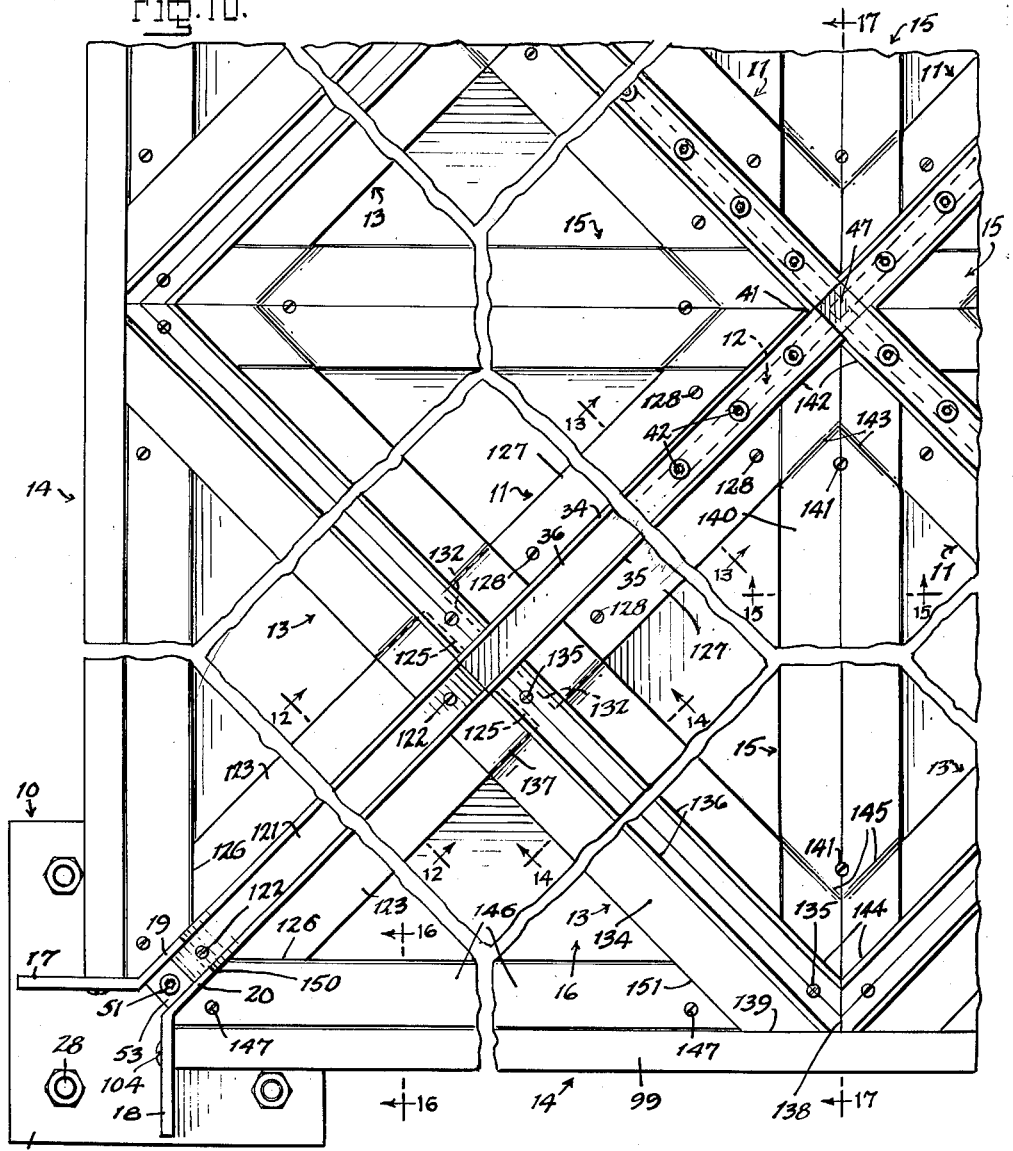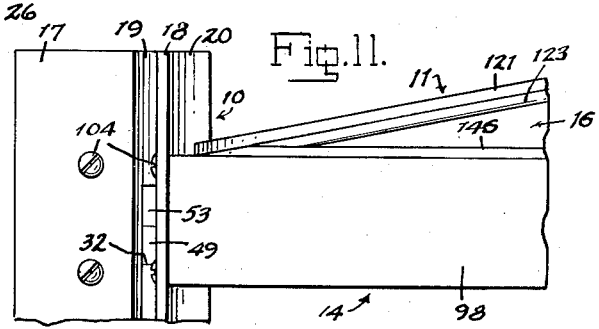

Dec. 26, 1961     E. F. NOYES     3,014,558
SHELTER STRUCTURE
Filed Jan. 30, 1961     7 Sheets-Sheet 5
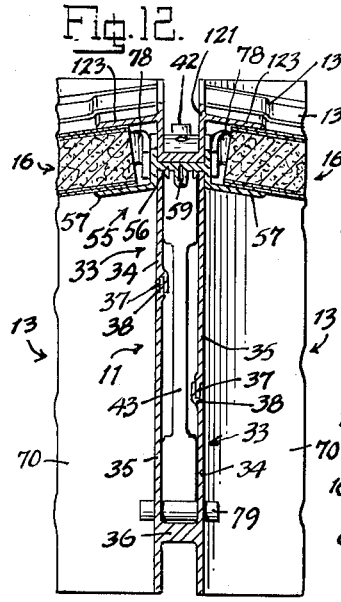
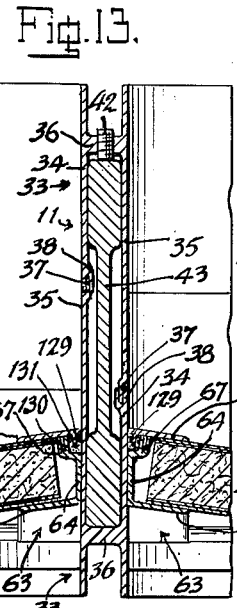
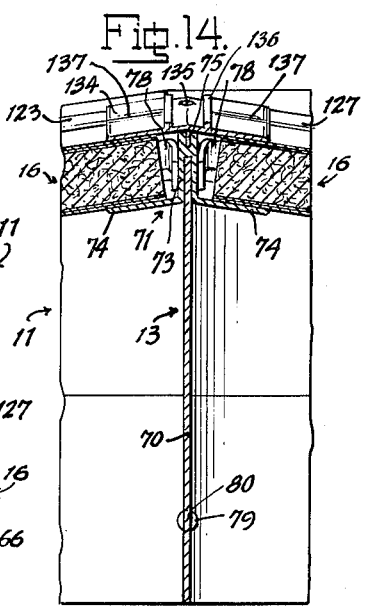
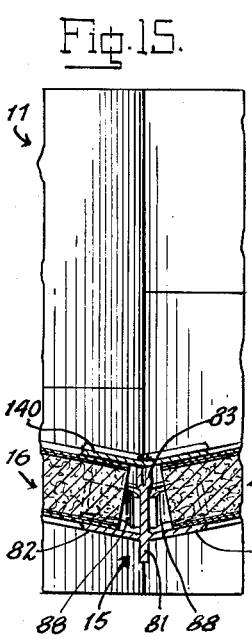
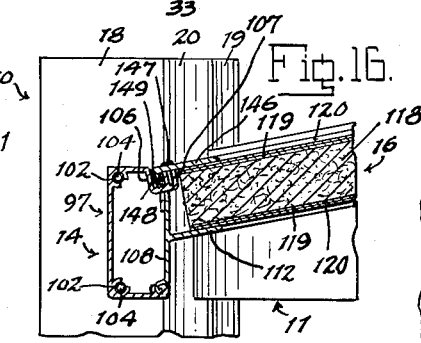
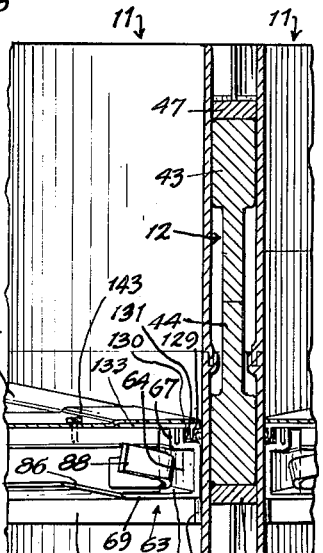
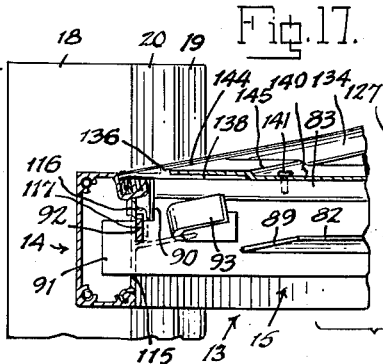
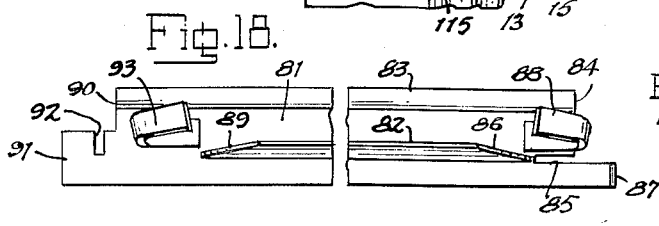
INVENTOR.
ELIOT F. NOYES
BY
ATTORNEY.

Dec. 26, 1961　　　　　　　　　E. F. NOYES　　　　　　　　　3,014,558
SHELTER STRUCTURE
Filed Jan. 30, 1961　　　　　　　　　　　　　　　　　　7 Sheets-Sheet 6
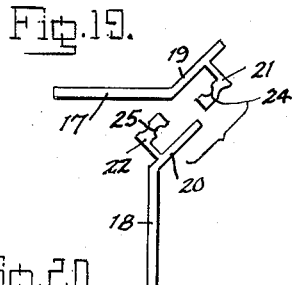
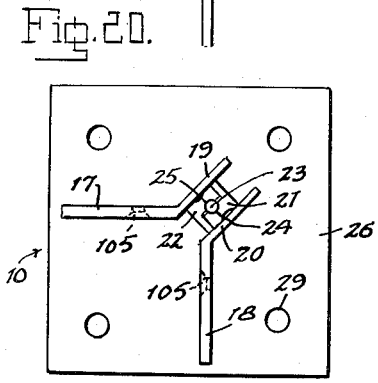
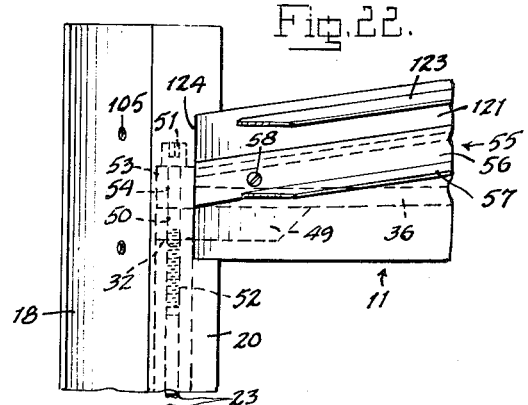
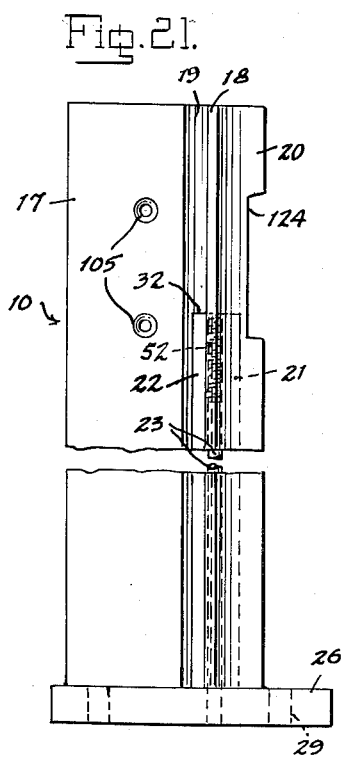
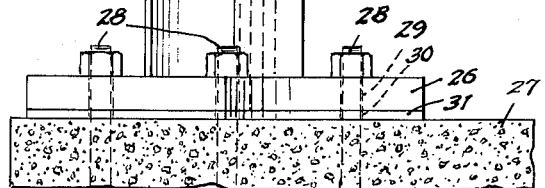
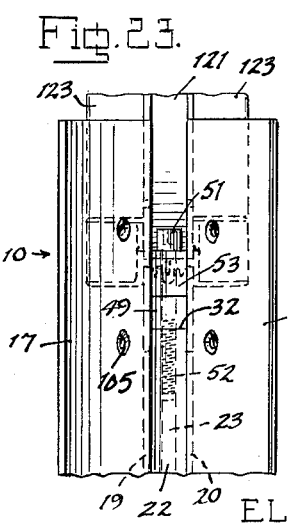
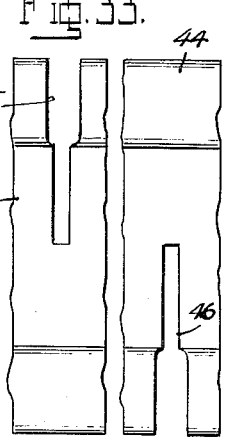
INVENTOR.
ELIOT F. NOYES
BY
ATTORNEY Dec. 26, 1961   E. F. NOYES   3,014,558
SHELTER STRUCTURE
Filed Jan. 30, 1961   7 Sheets-Sheet 7
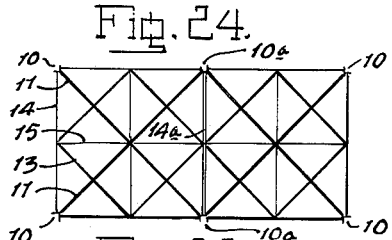
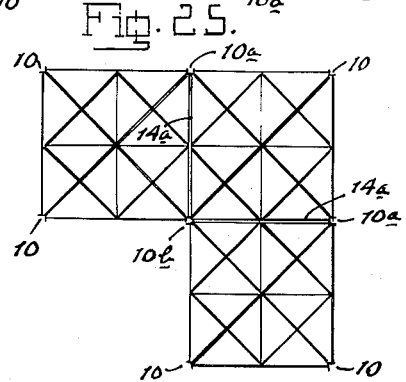
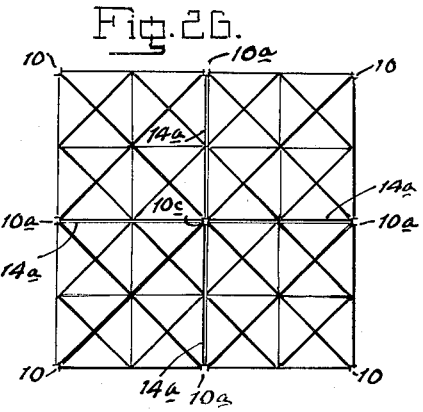
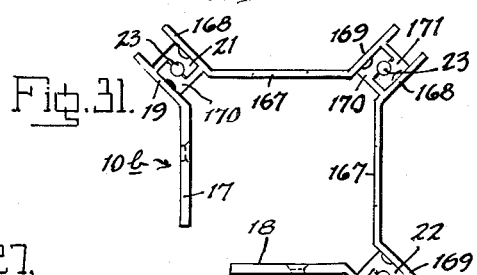
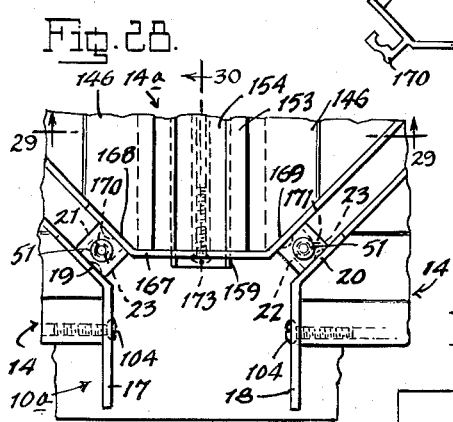
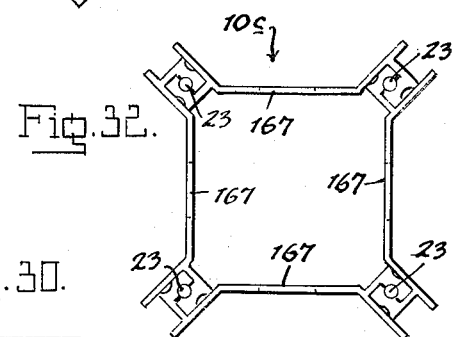
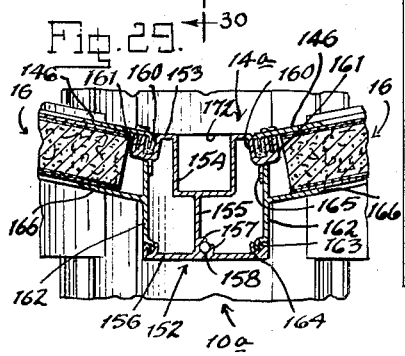
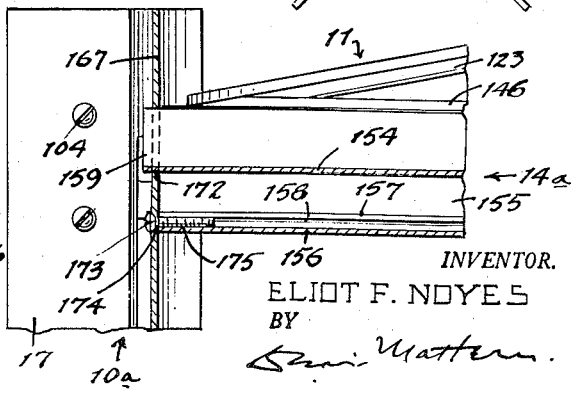
INVENTOR.
ELIOT F. NOYES
BY
ATTORNEY United States Patent Office  3,014,558
Patented Dec. 26, 1961

3,014,558
SHELTER STRUCTURE
Eliot F. Noyes, 105 Main St., New Canaan, Conn.
Filed Jan. 30, 1961, Ser. No. 85,622
21 Claims. (Cl. 189—2)

The present invention relates to a shelter structure, and the present application is a continuation-in-part of my patent application for Shelter Structure, Serial No. 839,713, filed September 14, 1959, now abandoned. The shelter structure of the invention may be used for various purposes, for example, as a shelter on a patio, on a beach, beside a swimming pool, as a carport, or as a boat house, etc.

An object of the invention is to provide a light weight, maintenance-free structure in which the principal components making up the structural frame are in the form of pre-fabricated modular units consisting of extruded lengths of light-weight metal, as for instance anodized aluminum alloy, and in which the principal connections between the various components are effectually concealed so that the finished structure presents clean smooth surfaces.

Another object is to provide a shelter structure which lends itself to fast and convenient erection, while at the same time having the strength and durability necessary for permanence.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 6 is a side elevation, partially broken away, of one of the main beam members, and showing the central coupling member and the auxiliary beams attached thereto;

FIG. 7 is a fragmentary side elevation of the upper central portion of the main beam with the members normally secured thereto removed;

FIG. 8 is a plan view, partially broken away, of the main beam as seen in FIG. 6, and also showing one of the valley strip members in separated relation;

FIG. 9 is a vertical sectional view partially broken away taken along the line 9—9 of FIG. 6;

FIG. 10 is a plan view similar to FIG. 3, and showing the roof panels and panel retaining strips in place;

FIG. 11 is a side elevation of the upper end portion of the corner post as seen in FIG. 10;

FIG. 12 is a vertical sectional view taken along the line 12—12 of FIG. 10 and showing the outer part of of a main beam;

FIG. 13 is a vertical sectional view taken along the line 13—13 of FIG. 10 and showing the inner part of a main beam;

FIG. 14 is a vertical sectional view taken along the line 14—14 of FIG. 10 and showing one of the auxiliary beams;

FIG. 15 is a vertical sectional view taken along the line 15—15 of FIG. 10 and showing a valley strip;

FIG. 16 is a vertical sectional view taken along the line 16—16 of FIG. 10 and showing a fascia member;

FIG. 17 is a vertical sectional view taken along the line 17—17 of FIG. 10 and showing the connection of a valley strip to a fascia member and to the main beams;

FIG. 18 is a side elevation partially broken away of a valley strip;

FIG. 19 is a top plan view showing the two interengaging extruded members for forming a corner post in separated relation;

FIG. 20 is a top plan view showing an assembled corner post secured upon a base plate;

FIG. 21 is a side elevation of an assembled corner post;

FIG. 22 is a side elevation showing the corner post mounted upon a concrete base with a main beam supported thereby;

FIG. 23 is a side elevation turned 45° from the view as seen in FIG. 22 and showing the engagement of the outer end of a main beam with a corner post;

FIGS. 24, 25 and 26 are plan views showing the manner in which the basic shelter unit of the invention may be provided in connected multiples, FIG. 24 showing two longitudinally adjacent units, FIG. 25 showing three units forming an L, and FIG. 26 showing four units arranged in a square;

FIG. 27 is a top plan view of a post member which in association with similar post members as well as with the post members as seen in FIG. 19, is adapted to form corner posts for connection and support of the multiple shelter units;

FIG. 28 is a plan view showing the corner post for connecting two units along an outer side;

FIG. 29 is a vertical sectional view taken along the line 29—29 of FIG. 28 and showing a double fascia member for two adjacent units;

FIG. 30 is a vertical sectional view taken along the line 30—30 of FIG. 28;

FIG. 31 is a plan view of a corner post arrangement for use in a right angle corner connection as seen in FIG. 25 where three units are connected;

FIG. 32 is a plan view of a corner post arrangement for use as an internal post where four units are connected as seen in FIG. 26; and FIG. 33 (Sheet 6) is a side elevation of the central interlocking portions of the two I-beams for forming the central coupling member.

Figure 1:
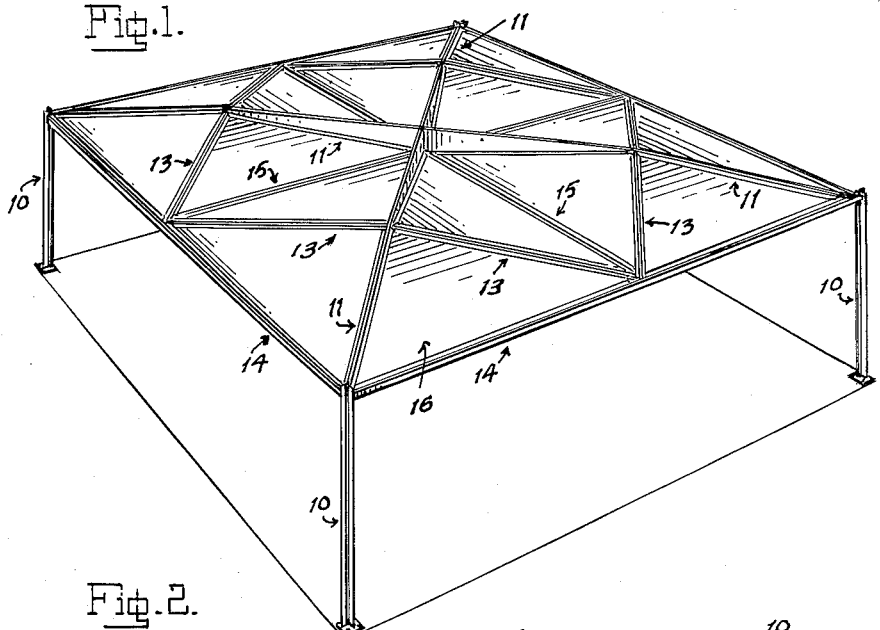
FIG. 1 is a perspective view of the shelter structure according to the invention.
Figure 2:
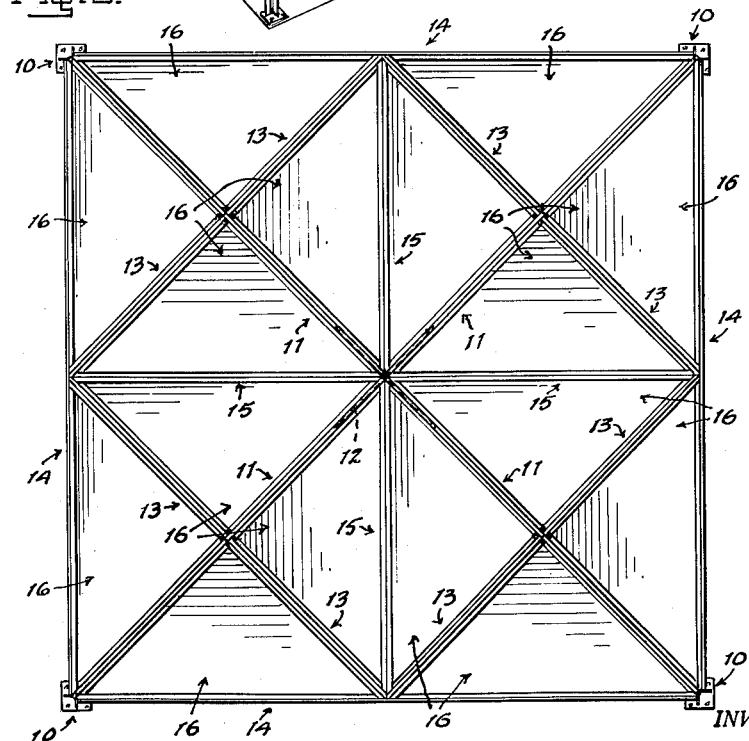
FIG. 2 is a top plan view.

Referring to the drawings and more particularly to FIGS. 1 and 2 the basic unit of the shelter structure according to the invention is rectangular in plan, preferably square, and comprises vertical supporting posts or columns 10 at each of the four corners which are rigidly anchored at their bases so that each post constitutes a vertical cantilever for the purpose of resisting horizontal displacement of the frame structure, and which also have the total roof load imposed upon them as vertical compressive force, each of the posts supporting one quarter of the total roof load.

Diagonally extending between and supported at their ends by the vertical posts are main beams each consisting of two main beam parts or sections 11—11 respectively extending from the supporting posts to the center of the structure where they are rigidly connected together by a cross-shaped hub insert or coupling member 12. The main beams are simple end-supported beams which together with the coupling member are in compression at their upper sides and in tension at their lower sides, the side walls of the beams being in direct tension.

Auxiliary cantilever beams 13 extend from a center point of each of the main beam parts 11 at right angles thereto, a pair of these cantilever beams meeting at their outer ends along each side of the frame structure where they engage and support the center of one of the four horizontal side face or fascia members 14 which extend between the corner posts in right angular relation to each other. The auxiliary cantilever beams are in tension at their upper sides and in compression at their lower sides, while the fascia members at their center portions, where they are supported by the auxiliary cantilever beams, are in tension at their upper sides and in compression at their lower sides, and at their portions at each side of the center portions the stresses are reversed, being in compression at their upper sides and in tension at their lower sides.

Horizontal valley strip or side members 15 are supported at their inner ends at the center intersection of the main beams and at their outer ends by the convergent outer ends of the pairs of auxiliary beams 13, these valley strip members dividing the large square formed by the fascia members into four squares, each having main and auxiliary beams diagonally extending between its corners. The valley strips are in compression at their upper sides and in tension at their lower sides.

Thus the frame provides a structure in which each of the four squares comprises four isosceles triangular spaces in which triangular panel members 16 are disposed. The horizontal base edges of the panels are supported by means provided upon the horizontal fascia and valley strip members, while their side edges are supported in upwardly inclined relation upon inclined supporting means provided upon the main and auxiliary beams. The four panels of each of the four square sections thus provide a pyramid structure as is clear from FIG. 1.

The inner portions of the main beams 11 extending from the centers of the four pyramidal sections to the center of the complete shelter unit preferably have horizontal upper edges, so that these inner portions present an upwardly exposed beam structure extending between the centers of the four pyramidal sections. The upper edges of the outer portions of the main beams extending from the centers of the pyramidal sections to the corner posts are preferably inclined in parallel relation to the inclination of the pyramidal sections.

Each of the corner posts 10 comprises a pair of extruded vertical members 17 and 18 disposed at a right angle to each other and respectively provided with flange extensions 19 and 20 disposed at 45° angles to the members 17 and 18 and in parallel spaced relation to each other. The flange extension 19 has a key formation 21 of right angular or L-shape in cross section and extending inwardly from a point near its outer edge, and the flange extension 20 has a similar but opposed key formation 22 extending outwardly from a point near its inner edge, these formations being interlocked as seen in FIG. 20 and secured by a locking rod 23 engaged in a cylindrical passage provided between the key formations by semi-cylindrical recesses 24 and 25 respectively provided in the opposed faces of the key formations 21 and 22. Thus a rigid post is provided having right angular sides which are adapted to form the ends of the adjacent side faces of the rectangular shelter unit and having inwardly extending diagonal spaced flanges between which the end of a diagonal main beam part 11 is secured and supported, as will presently more fully appear.

The lower end of the assembled post is secured as by welding to a base plate 26, preferably square with its sides parallel to the right angular sides of the posts, and which is rigidly anchored to a concrete foundation 27, as seen in FIG. 22, by bolts 28 set in the foundation and engaged in bolt holes 29 in the base plate, the bolts being extended through bolt holes 30 of a leveling plate 31, preferably of steel and of corresponding shape to the base plate to register therewith, set into the concrete foundation 27 for engagement with the lower side of the base plate.

At the upper end of the post at a suitably spaced distance below its upper extremity the key formations 21 and 22 are removed to provide a horizontal seat 32 upon the upper ends of the key formations between the diagonal flanges 19 and 20 for supporting the end of a diagonal main beam part, as will presently more fully appear. As above pointed out the post rigidly anchored at its lower end constitutes a free standing vertical cantilever which resists horizontal displacement of the frame structure and has its quota of the total roof load, i.e., one quarter, imposed upon it as vertical compressive force.

Each diagonal main beam part 11 which extends from a supporting post 10 to the center of the shelter structure is formed of a pair of extruded beam members 33—33 which are interengaged with one member in opposed inverted relation to the other member, as seen in FIG. 13. Each member comprises a laterally opposed side walls 34 and 35 connected in parallel spaced relation from their outer laterally aligned edges by an integral lateral web 36, the side wall 35 having a substantially greater vertical dimension than the side wall 34 and being provided at its inner edge with a longitudinal inwardly offset tongue flange 37, and the laterally offset inner edge of the wall 34 being provided with a longitudinal inwardly offset groove 38, the tongue flange of each member being received in the groove of the other member and the interengaged joints being thereupon secured by welding along the joints. The structure provides a relatively light weight hollow beam of great tensile and compressive strength in which the webs 36 constitute transverse top and bottom walls.

As seen in FIGS. 6 and 7 the inner half of each main beam part has a horizontal upper edge while the outer half has a downwardly offset and downwardly inclined upper edge provided by cutting away the beam along a vertical line to provide a vertical edge 39 extending to the lower edge of the upper web 36 and along an inclined line to provide an inclined edge 40 extending from the lower end of the vertical edge 39 to the outer end of the beam where it is spaced a short distance above the lower web 36, the angle of the inclined edge being preferably of the order of substantially 8°.

Figure 3:
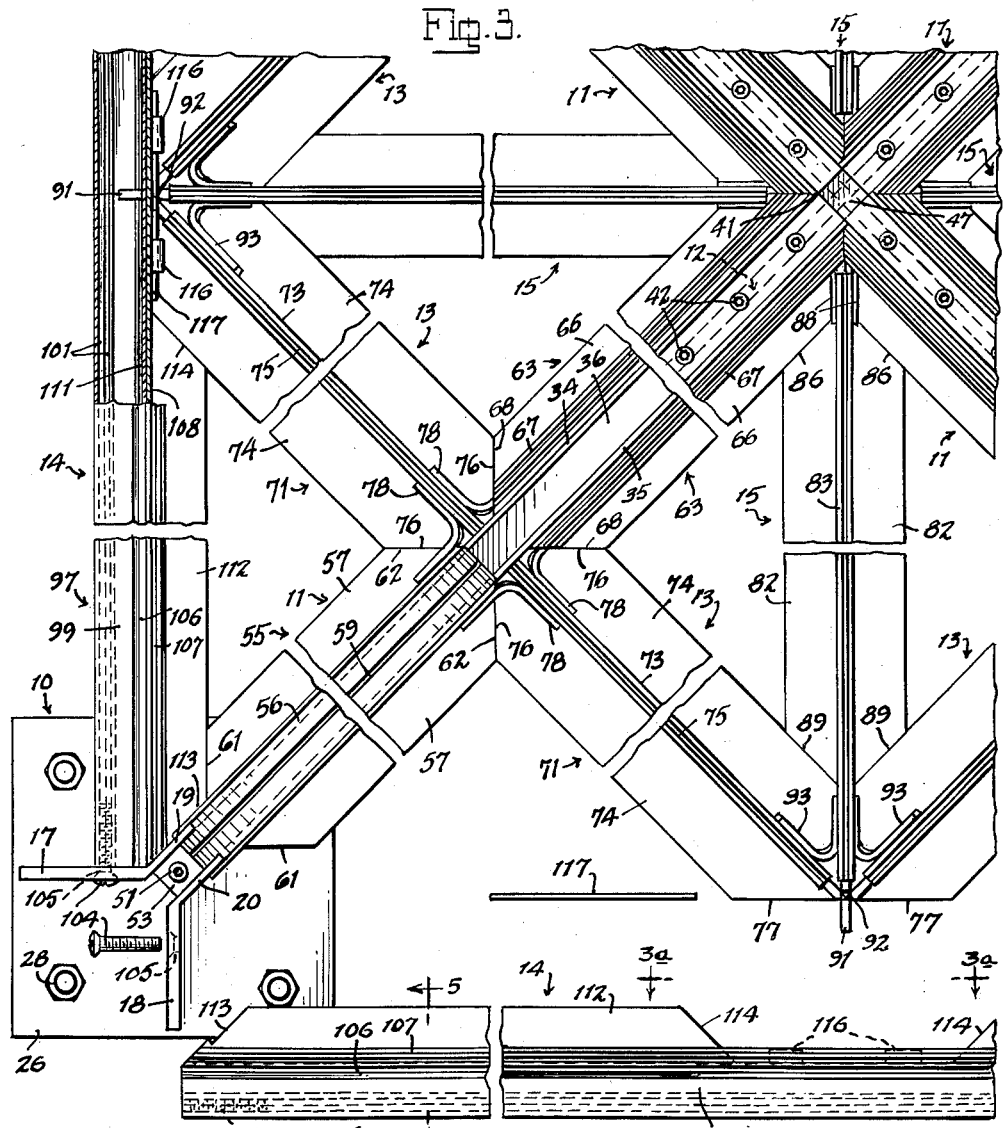
FIG. 3 is a plan view on an enlarged scale and partially broken away of one corner section of the structure with the roof panels and the panel retaining strips removed, and showing one of the side face or fascia members in separated relation.

At their inner ends each main beam part is square cut as clearly shown in FIGS. 6 and 8 and the vertical edge of one side wall is cut away in offset relation to the projected vertical edge of the opposite side wall a distance corresponding to the thickness of the side wall to provide a vertical recess 41 for the purpose of interengaging the meeting inner ends of the four main beam parts, the projected edge of each main beam part being engaged in the recess 41 of the adjacent main beam part, as clearly shown in FIG. 3. The meeting ends of the main beam parts are rigidly connected together by the cross-shaped hub insert or coupling member 12 having its four arms respectively inserted in the hollow ends of the main beam parts with their lower sides resting upon the lower webs 36 and their upper sides slightly spaced below the upper webs 36. Each beam is secured to an arm of the coupling member by a series of pressure screws 42 screwed in the upper web 36 and bearing upon the upper side of the arm to thus draw the beam upwardly into tight engagement with the lower side of the arm.

The coupling member is preferably constructed of a pair of crossed I-beam members 43 and 44 which as seen in FIG. 33 are respectively provided with cut-outs 45 and 46, the cut-out 45 extending downwardly from the top edge to the center of the member 43 and the cut-out 46 extending from the bottom edge upwardly to the center of the I-beam member 44, the outline shape of these cut-outs corresponding to the cross-sectional shape of the I-beam members. One I-beam member is slipped into interlocking engagement with the other I-beam member through interengaging in the cut-outs 45 and 46 and the assembled I-beam members are thereupon rigidly welded to each other. At the center of the coupling member there is welded at its upper and lower ends a pair of square filler blocks 47 and 48 which fill the square spaces formed by the inner ends of the upper and lower webs 36 of the assembled main beam parts.

At the outer end of each main beam part 11 a support bar 49 is secured as by welding or riveting to the under side of the lower web 36 between the side walls, its end being projected from the end of the beam part and provided with a vertical bolt hole 50. As clearly shown in FIG. 22 the suport bar rests upon the seat 32 of the post 10 and is secured by a bolt 51 engaged downwardly through the bolt hole 50 and screwed into the upper end of the cylindrical opening provided by the recesses 24 and 25 of the key formation 21 and 22, which opening is suitably threaded as at 52 for this purpose. A filler block 53 having a bolt hole 54 is interposed between the support bar and the head of the bolt 51 and encloses the end of the beam part.

The four main beam parts 11, rigidly connected by the coupling member 12 and supported at their outer ends upon the corner posts 10, provide two intersecting main beams extending diagonally between the opposite corner posts which main beams are simple end-supported beams in compression at their upper sides and in tension at their lower sides.

Each of the frame components making up the roof frame, namely, the main beam parts 11, the auxiliary cantilever beams 13, the fascia members 14 and the valley strip members 15, is provided with means for supporting and securing a marginal edge portion of a triangular panel member 16, such means consisting of a flange strip means engaging the under side of the panel margin in supporting relation and a capping strip means engaging the upper side of the panel margin to secure it and enclose its edge.

The flange strip 55 of the outer half portion of each main beam part 11 comprises an intermediate mounting portion 56 of H-shape in cross-section which straddles the upper inclined edge 40 and is provided at the lower end of each of its vertical sides with an outwardly extending flange 57 inclined downwardly from the vertical side at an angle corresponding to the angle of the inclined edge 40, i.e., an angle of the order of substantially 8°. The flange strip is secured to the main beam part by screws 58 and extends from the vertical edge 39 to the outer end of the main beam part, as clearly shown in FIG. 6. Centrally of the mounting portion 56 there is provided a longitudinally grooved rib formation 59 for receiving the fastening screws of the capping strip, as will hereinafter more fully appear, and in parallel spaced relation at the respective sides of the rib formation 59 there are provided positioning ribs 60—60 engaged within the side walls of the main beam part. The outer ends of the flanges 57 are mitred as at 61 for meeting the flanges of the fascia members 14 and the inner ends are mitred as at 62 for meeting the flanges of the auxiliary cantilever beams 13, as will hereinafter more fully appear.

At the respective sides of the inner half portion of each of the main beam parts 11, there are provided flange strips 63—63 inclined at the same angle but in the opposite direction to the inclined upper edge 40 of the outer half portion of the main beam part. Each flange strip 63 comprises a vertical side wall 64 secured by screws 65 to the side wall of the main beam part, a downwardly inclined panel supporting flange 66 along its lower edge, and an outwardly offset grooved rib formation 67 along its upper edge for receiving the fastening screws of the capping strip, as will hereinafter more fully appear. The outer ends of the flanges 66 are mitred as at 68 to meet the flanges of the auxiliary cantilever beams 13 and the inner ends are mitred as at 69 to meet the flanges of the valley strip members 15, as will hereinafter more fully appear.

At each side of each main beam part 11 substantially at its mid-point there is secured the inner end of an auxiliary cantilever beam 13 which extends at right angles to the main beam part to the mid-point of a fascia member 14. Each auxiliary cantilever beam comprises a web plate member 70, having a vertical inner edge for abutment with the side of the main beam part, a horizontal lower edge flush with the lower edge of the main beam part, and an upper edge inclined downwardly from the main beam at a corresponding angle to the angle of the inclined edge 40, i.e., an angle of the order of substantially 8°. A flange strip 71 is secured by screws 72 upon the upper inclined margin of the web plate 70 and comprises an intermediate channel portion 73 fitted over said margin provided along its lower edge at its respective sides with longitudinal panel supporting flanges 74—74 and provided in its upper side with a longitudinal groove 75 for receiving the fastening screws of a capping strip, as will hereinafter more fully appear. The inner ends of the flanges 74 are mitred as at 76 to meet the mitred edges 62 and 68 of the flange strips 55 and 63, and are mitred at their outer ends as at 77 to meet the fascia and valley strip members, as will hereinafter more fully appear.

The assembled auxiliary beams 13 are secured to the main beam part 11 at each side by corner angle members 78 welded to the upper ends of the flange strips 71 at each side and to the upper ends of the flange strips 55 and 63 at each side, as clearly shown in FIGS. 6 and 8. The lower portions of the web plates 70 are positioned by a pin member 79 disposed transversely of the main beam part 11 at the upper side of the lower web portion 36 and provided with projected ends having vertical slots 80—80 in which the vertical edges of the web plates at the respective sides of the main beam part are engaged.

The auxiliary cantilever beams 13 are supported as cantilevers extending at each side of the main beam parts with their upper edges in tension and their lower edges in compression. Thus the auxiliary cantilever beams are self-supported at their outer ends and support the mid-points of the fascia members 14 and the outer ends of the valley strip members 15 without any load being imposed upon these members at their points of support by the auxiliary cantilever beams.

The valley strip members 15, FIGS. 3, 8, 15, 17 and 18, extend horizontally from the lower convergent ends of the adjacent flange strips 63 at the intersection of the diagonal main beams to the convergent outer ends of the adjacent auxiliary cantilever beams 13, and each comprises a central web strip 81 provided along its respective sides in parallel upwardly spaced relation to its lower edge with panel supporting flanges 82—82 inclined upwardly from the web strip at an angle corresponding to the angle of inclination of the panels 16, i.e., an angle of substantially 11°. Along the upper side of the web strip 81 there is provided a longitudinally grooved rib formation 83 for receiving the fastening screws of the capping strip, as will presently more fully appear. At its inner end the web strip is cut away as at 84 to clear the mitred ends 69 of the adjacent flange strips 63 and is slotted as at 85 in line with the flanges 82 of the valley strip to receive the meeting ends of the flanges 66 of the flange strips 63.

The inner ends 86 of the flanges 82 are mitred to meet the edges of the flanges 66, and the inner end 87 of the lower marginal portion of the web strip below the slot 85 is right-angularly pointed to fit in the right angle corner at the intersection of the main beams. The valley strip is secured to the flange strips 63 by corner angle members 88—88 welded to the respective sides of the web strip 81 and to the side walls 64 of the adjacent flange strips 63. The outer ends 89 of the flanges 82 are mitred to meet the longitudinal edges of the inner flanges 74 of the adjacent auxiliary cantilever beams 13, the lower mitred ends 76 of these flanges 74 being engaged with the sides of the web strip 81 in line with the flanges 82.

At its outer end the web strip 81 is cut away at its upper corner as at 90 to provide a projecting tongue 91 for engagement with the fascia member 14, and a downwardly extending notch 92 is provided in the upper edge of the tongue 91 for receiving a lock bar, as will presently more fully appear. The forward end of the valley strip member is secured to the lower end of the adjacent auxiliary cantilever beams by corner angle members 93—93 welded to the opposite sides of the web strip 81 and to the inner sides of the intermediate channel portions 73 of the adjacent auxiliary cantilever beams 13, as clearly shown in FIG. 3.

In order to provide a clearance space in horizontal line with the lock bar notch 92, the lower ends of the intermediaate channel portions 73 of the adjacent auxiliary cantilever beams 13 are cut away as at 94, and in order to provide a closed tight fit between the web plates 70 and the sides of the web strip 81 the outer end edges of the web plates are right-angularly pointed at 95 where they meet the sides of the web strip, and are beveled as at 96 below the web strip in the planes of the mitred edges 77 of the outer flanges 74, so that the convergent ends of the adjacent web plates meet below the web strip and their beveled edges 96 engage the inner side of the fascia member, as will presently more fully appear.

Figure 4:
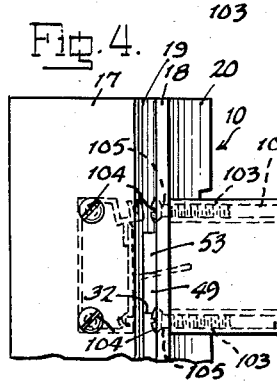
FIG. 4 is a side elevation of the upper end portion of the corner post showing the fascia member attached.

The fascia members 14 extend horizontally between the corner posts 10 and are supported at their mid-points by the convergent outer ends of the adjacent auxiliary cantilever beams 13 as clearly shown in FIG. 3. Each fascia member comprises an extruded body part 97, FIGS. 3–5, including an outer side wall 98, an upper wall 99 and a lower wall 100, the internal upper and lower corners each having longitudinal rib formations 101—101 curved to form langitudinal substantially cylindrical passages 102 which are interiorly threaded at their ends as at 103 to receive fastening screws 104 engaged through holes 105 in the side walls 17 and 18 of the corner posts 10 to thus fasten the ends of the fascia member to the corner posts. Along the inner edge of the upper wall 99 there is provided a sealing channel formation 106 having a grooved rib 107 for receiving the fastening screws of the capping strip, as will presently more fully appear. The inner side wall is provided by an extruded strip part 108 having a curved hook formation 109 along its lower edge which hingedly engages in a curved groove formation 110 along the inner edge of the lower wall 100, the upper marginal edge portion of the inner wall being secured by welding to a longitudinal lip formation 111 projecting downwardly from the sealing channel formation 106.

A panel supporting flange 112 is provided along the strip part 108 which is inclined upwardly at an angle corresponding to the upward angle of the flanges 82 of the valley strip member 15, i.e., an angle of the order of substantially 11°. The outer ends 113 of the flange 112 are mitred to fit against the diagonal flanges 19 and 20 of the corner posts with the outer mitred ends 61 of the flanges 57 of the main beam parts 11 meeting the inner longitudinal edges of the flanges 112 of the adjacent fascia members.

At the mid-point of each fascia member the flange 112 is cut away to provide longitudinally spaced inner mitred ends 114—114 which meet the longitudinal outer edges of the flanges 74 of the adjacent auxiliary cantilever beams 13, the mitred outer ends 77 of these flanges meeting the inner face of the strip 108 in longitudinal line with the flange 112.

At the mid-point the strip 108 is provided with a vertical slot 115 in which the tongue 91 at the outer end of the valley strip member 15 is received, and at each side of the slot 115 in longitudinal line with the notch 92 there are provided downwardly directed hook members 116—116 preferably cut and bent outwardly from the strip part 108 and which receive a locking bar 117 engaged in the notch 92. The downwardly opening hooks and the upwardly opening notch lock the mid-point of the fascia member to the outer end of the valley strip member and to the convergent ends of the adjacent auxiliary cantilever beams 13 connected thereto. As is clear from FIG. 3 the fascia member is assembled with the roof frame, which has previously been mounted upon the corner posts 10, by laterally moving it into place to engage the tongue 92 in the slat 115 and then securing the ends to the corner posts by means of the screws 104. Thereupon the locking bar 117 is longitudinally slid into place.

The triangular panel members 16, FIGS. 10–16, are placed in the triangular spaces defined by the roof frame members and rest upon the several panel supporting flanges where they are retained in place and their edges sealed by capping strips. The panel members are each in the form of a laminated sandwich comprising an inner body 118 of light weight fibre board, preferably including asbestos or other suitable fire-resistant fibre material, provided at its respective upper and lower sides with protective stiffening layers 119—119 of tempered hardboard or the like covered with thin sheets 120 preferably of anodized aluminum.

The capping strips 121 at the outer half portions of the main beam parts 11 are of channel form in cross-section and each is engaged within the channeled intermediate mounting portion 56 of the flange strip 55 and secured by screws 122 engaged in the longitudinally grooved rib formation 59, being provided upon its respective side walls with panel retaining flanges 123—123 transversely inclined in parallel relation to the inclined panel supporting flanges 57, and which engage the marginal edge portions of panels to retain them upon the supporting flanges and to weather seal their edges. The inner end of the channel strip 121 abuts the vertical edge surface 39 of the main beam part with the upper edges of its side walls flush with the upper horizontal edges of the side walls of the main beam part. The outer end is flush with the vertical outer end of the main beam part and is engaged together with the main beam part in cut-outs 124 in the flange extensions 19 and 20 of the corner posts, as clearly shown in FIG. 22. The inner ends 125 of the panel retaining flanges 123 are square cut contiguous to the intermediate channel ports 73 of the auxiliary cantilever beams 13, and their outer ends 126 are mitred to meet the longitudinal edges of the capping strips of the fascia members 14, as will presently more fully appear.

The inner half portions of the main beam parts 11 are provided at their respective sides with capping strips 127—127 secured by screws 128 engaged in the grooved rib formations 67 of the panel supporting flange strips 63, each being provided adjacent its inner longitudinal edge with a longitudinal flange 129 engaged in the channel 130 provided by the outward offset of the grooved formation 67, and within which channel there is provided a suitable weather sealing or caulking compound 131 to seal the edge of the panel against the entrance of water between the capping strip and the side wall of the main beam part. The outer ends 132 of the capping strips 127 are square cut opposite the square cut ends 125 of the panel retaining flanges 123, and their inner ends 133, FIG. 17, are mitred to meet the inner ends of the adjacent capping strips 127 at the intersection of the main beams along the center lines of the valley strip members 15.

The capping strips 134 of the auxiliary cantilever beams 13 are of inverted V-shape in cross-section and each is secured along its longitudinal center line to the intermediate channel portion 73 by screws 135 engaged in the longitudinal groove 75, its longitudinal sides at each side of the center line being inclined in parallel relation to the inclined panel supporting flanges 74. Stiffening ribs 136—136 are preferably provided in parallel relation at each side of the center line. At their upper ends the capping strips 134 are square cut to abut the side walls of the main beam part and are jogged as at 137 to engage over the ends of the flanges 123 and the capping strips 127. At their outer ends they are each provided with a mitre cut 138, FIG. 17, to meet the corresponding end of the capping strip of the adjacent auxiliary cantilever beam along the longitudinal center line of the valley strip member 15, and are also provided with a mitre cut 139 to engage the inner side of the mid portion of the fascia member 14. The capping strips 134 retain the marginal edges of the panels 16 upon the flanges 74 and provide a weather seal against the entrance of water to the edges of the panels.

The capping strips 140 of the valley strip members 15 are of V-shape in cross-section and each is secured along its longitudinal center line to the web strip 81 by screws 141 engaged in the longitudinally grooved rib formation 83, its longitudinal sides at each side of the center line being inclined upwardly in parallel relation to the inclined panel supporting flanges 82. Its inner end 142 is right angularly pointed to engage in the corner intersection of the main beam, and is jogged as at 143 to fit over the meeting ends 133 of the capping strips 127 of the adjacent main beam parts 11. Its outer end is similarly right angularly pointed as at 144 to engage in the right angular corner formed by the stiffening ribs 136 of the capping strips 134 of the adjacent auxiliary cantilever beams 13 and is jogged as at 145 to fit over the meeting ends 138 of the capping strips 134. The capping strips 140 retain the marginal edge portions of the panels 16 upon the panel supporting flanges 82 and provide a weather seal against the entrance of water to the edges of the panels.

The capping strips 146 of the fascia members 14 provided at each side of the mid-point of each fascia member are each secured by screws 147 engaged in the groove of the rib 107, and each is provided adjacent its outer edge with a longitudinal rib 148 engaged in the sealing channel 106 within which there is provided a suitable weather sealing or caulking compound 149, to prevent the entrance of water between the outer edges of the capping strip and the top wall 99 of the fascia member. The outer end 150 of each capping strip 146 is mitred to engage the side wall of the main beam part 11 with the mitred end 126 of the adjacent flange 123 of the capping strip 121 engaging its longitudinal edge as clearly seen in FIG. 10. The inner end 151 is mitred to engage the outer longitudinal edge of the capping strip 134 of the adjacent auxiliary cantilever beam 13. The capping strips 146 retain the outer marginal edges of the panels 16 upon the panel supporting flanges 112 and provide a weather seal against the entrance of water to the edges of the panels.

In FIGS. 24–32 there are shown modifications in which a plurality of the basic shelter units as hereinbefore described are joined. To this end a modified double fascia member 14a, FIGS. 28–30, is employed to provide a common connecting side for adjacent shelter units, and modified corner posts 10a, FIGS. 28–30, 10b, FIG. 31, and 10c, FIG. 32, are employed, the post 10a connecting longitudinally aligned fascia members of adjacent shelter units as shown in FIGS. 24–26, the post 10b connecting right-angularly disposed fascia members of adjacent shelter units as shown in FIG. 25, and the post 10c connecting the double fascia members 14a of four basic shelter units in a square arrangement as shown in FIG. 26.

Figure 5:
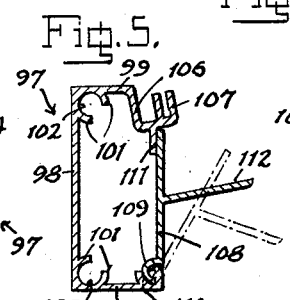
FIG. 5 is a vertical section view on an enlarged scale of the fascia member taken along the line 5—5 of FIG. 3, the dot-and-dash lines showing the manner in which the inner wall part of the fascia member is assembled.
Figure 3A:
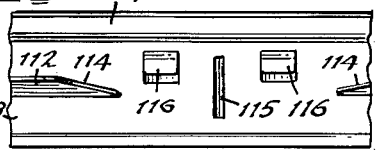
FIG. 3a is a fragmentary side elevation of the inner side of the fascia member as seen along the line 3a—3a of FIG. 3.

The modified fascia unit 14a is generally similar to the fascia member 14 as shown in FIG. 5, and comprises an extruded body part 152 including an upper wall 153 provided centrally with a longitudinally extending channel formation 154 connected at its base by a vertical wall 155 to a lower wall 156. The vertical wall 155 is offset from the center line of the body member and within the corner formed with the lower wall 156 there are provided longitudinal rib formations 157—157 curved to form a longitudinal substantially cylindrical passage 158 centrally of the body member. At its end the channel formation 154 is extended, as at 159, for engagement in an opening of the post, as will presently more fully appear. Along each of the outer edges of the upper wall 153 there is provided a sealing channel formation 160 having a grooved rib 161 for receiving the fastening screws of the capping strip, as will presently more fully appear. The two side walls are each provided by an extruded strip part 162 having a curved hook formation 163 along its lower edge which hingedly engages in a curved groove formation 164 along the outer edge of the lower wall 156, the upper marginal edge portion of the strip part 108 being secured by welding to a longitudinal lip formation 165 projecting downwardly from the sealing channel formation 160. A panel supporting flange 166 is provided along the strip part 162 upon which the marginal edge portion of a panel member 16 is supported and retained by a capping strip 146 in similar manner to the retaining of the panels upon the other fascia members of the basic shelter unit.

The post 10a is made up of a pair of the extruded vertical post members 17 and 18, see FIG. 19, and a modified extruded vertical post member 167, see FIG. 27, provided along its respective vertical edges with flange extensions 168 and 169 inclined in opposite directions at 45° angles to the member 167. The flange extension 168 has a key formation 170 extending outwardly from a point near its inner edge and the flange 169 has a similar key formation 171 extending inwardly from a point near its outer edge, these formations being interlocked as seen in FIG. 28 with the key formations 21 and 22 of the post members 17 and 18 by locking rods 23 in similar manner to the assembly of the post 10, to thus provide a three sided post which supports the ends of two main beam parts 11, two single fascia members 14, and a double fascia member 14a. An opening 172 is provided in the post member 167 to receive the projected end 159 of the channel formation 154 which serves as a gutter for the flow of water into the space defined by the post members, which thus acts as a down spout. The fascia member 14a is secured to the post member 167 by a screw 173 engaged through a hole 174 and screwed into the end of the cylindrical passage 158 which is threaded as at 175 for this purpose. As is clear from FIGS. 28–30 the main beam parts 11 and the fascia members 14 are secured to the post 10a in similar manner to their securing to the post 10.

The post 10b employed in the arrangement as shown in FIG. 25, in addition to the posts 10 and 10a, is made up of post members 17 and 18 and a pair of post members 167 connected thereto as shown in FIG. 31, thus providing a four sided post structure which supports the ends of three main beam parts 11, two double fascia members 14a, and two single fascia members 14.

The post 10c employed in the arrangement shown in FIG. 26, in addition to the posts 10 and 10a, is made up of four post members 167 connected as shown in FIG. 32 to provide a four sided post structure which supports the ends of four main beam parts 11 and four double fascia members 14a.

What is claimed is:

1. In a shelter structure, four upright columns positioned at the four corners of a rectangle, side members extending between and supported at their ends by said columns, a pair of intersecting diagonal main beams respectively supported at their ends upon diagonally opposed pairs of said columns, and auxiliary cantilever beams secured at their inner ends to and extending from the opposed sides of each of said main beams at intermediate points between its outer ends and its intersection with the other main beam, the upper sides of said auxiliary beams being in tension and their lower sides in compression and each being connected at its outer end to and supporting one of said side members at a point intermediate its ends.

2. In a shelter structure, four upright columns positioned at the four corners of a rectangle, side members extending between and supported at their ends by said columns, a pair of intersecting diagonal main beams respectively supported at their ends upon diagonally opposed pairs of said columns, the upper sides of said main beams being in compression and their lower sides in tension, and auxiliary cantilever beams secured at their inner ends to and extending from the opposed sides of each of said main beams at intermediate points between its outer ends and its intersection with the other main beam, the upper sides of said auxiliary beams being in tension and their lower sides in compression and each being connected at its outer end to and supporting one of said side members at a point intermediate its ends, each said column supporting one quarter of the total load of said main and auxiliary beams as vertical compressive force.

3. In a shelter structure, four upright columns positioned at the four corners of an equal sided rectangle, equal length side members extending between and supported at their ends by said columns, a pair of intersecting diagonal main beams respectively supported at their ends upon diagonally opposed pairs of said columns, and auxiliary cantilever beams secured at their inner ends to and extending at right angles from the opposed sides of each of said main beams at mid-points between its outer ends and its intersection with the other main beams, the upper sides of said auxiliary beams being in tension and their lower sides in compression and each being connected at its outer end to and supporting one of said side members at its mid-point.

4. In a shelter structure, four upright columns positioned at the four corners of a rectangle, horizontal side members extending between and supported at their ends by said columns, a pair of intersecting diagonal main beams respectively supported at their ends upon diagonally opposed pairs of said columns, auxiliary cantilever beams secured at their inner ends to and extending from the opposed sides of each of said main beams at intermediate points between its outer ends and its intersection with the other main beam, the upper sides of said auxiliary beams being in tension and their lower sides in compression and each being connected at its outer end to and supporting one of said side members at its midpoint and horizontal members respectively extending from the intersection of said main beams to the mid-point of each of said side members, said main and auxiliary beams and said horizontal members defining an inner group of eight panel receiving openings, each in the shape of an isosceles triangle with said horizontal members forming the triangle bases, and said main and auxiliary beams and said side members defining an outer group of eight panel receiving openings, each in the shape of an isosceles triangle with said side members forming the triangle bases.

5. In a shelter structure, four upright columns positioned at the four corners of a rectangle, horizontal side members extending between and supported at their ends by said columns, a pair of intersecting diagonal main beams respectively supported at their ends upon diagonally opposed pairs of said columns, auxiliary cantilever beams secured at their inner ends to and extending from the opposed sides of each of said main beams at intermediate points between its outer ends and its intersection with the other main beam, the upper sides of said auxiliary beams being in tension and their lower sides in compression and each being connected at its outer end to and supporting one of said side members at its midpoint, horizontal members respectively extending from the intersection of said main beams to the mid-point of each of said side members, said main and auxiliary beams and said horizontal members defining an inner group of eight panel receiving openings, each in the shape of an isosceles triangle with said horizontal members forming the triangle bases, and said main and auxiliary beams and said side members defining an outer group of eight panel receiving openings, each in the shape of an isosceles triangle with said side members forming the triangle bases, and a plurality of panels, each in the shape of an isosceles triangle disposed in and closing one of said openings.

6. In a shelter structure, four upright columns positioned at the four corners of a rectangle, horizontal side members extending between and supported at their ends by said columns, a pair of intersecting diagonal main beams respectively supported at their ends upon diagonally opposed pairs of said columns, auxiliary cantilever beams secured at their inner ends to and extending from the opposed sides of each of said main beams at intermediate points between its outer ends and its intersection with the other main beam, the upper sides of said auxiliary beams being in tension and their lower sides in compression, and each being connected at its outer end to and supporting one of said side members at its midpoint, horizontal members respectively extending from the intersection of said main beams to the mid-point of each of said side members, said main and auxiliary beams and said horizontal members defining an inner group of eight panel receiving openings, each in the shape of an isosceles triangle with said horizontal members forming the triangle bases, and said main and auxiliary beams and said side members defining an outer group of eight panel receiving openings, each in the shape of an isosceles triangle with said side members forming the triangle bases, a plurality of panels, each in the shape of an isosceles triangle disposed in and closing one of said openings, means carried by said horizontal members and side members for receiving the base edges of said panels horizontally, and means carried by said main and auxiliary beams for receiving the side edges of said panels with said panels inclined to form the sides of pyramidal formations having their apices at the junctions of said auxiliary beams with said main beams.

7. In a shelter structure, four upright columns positioned at the four corners of a rectangle, and a pair of intersecting diagonal main beams respectively supported at their ends upon diagonally opposed pairs of said columns, the upper sides of said main beams being in compression and their lower sides in tension, and each of said main beams comprising two longitudinal sections in longitudinal alignment with each other, the inner end portions at least of each of said sections and having transversely spaced vertical side walls and vertically spaced horizontal top and bottom walls forming an open-ended rectangular tube, a rigid coupling member in the form of a cross having four arms respectively engaged in the tubular open-ended inner end portions of said beam sections with the horizontal top and bottom walls of said sections opposed vertically to the upper and lower sides of said arms, and pressure screw means in said top walls of said main beam sections bearing upon the upper sides of said arms to draw said bottom walls against the lower sides of said arms, whereby the upper sides of said arms are in compression and their lower sides are in tension and said side walls of said beam sections are in vertical tension.

8. In a shelter structure, four upright columns positioned at the four corners of a rectangle, horizontal side members extending between and supported at their ends by said columns, and a pair of intersecting diagonal main beams respectively supported at their ends upon diagonally opposed pairs of columns, said beam ends having vertical sides, each of said columns comprising companion vertical members secured to each other in laterally opposed relation, said members each including a vertical diagonally disposed flange in laterally opposed spaced parallel relation one to the other for receiving a beam end between them with said flanges parallel to said vertical sides of said beam end, vertical key formation on each diagonally disposed flange of each of said columns laterally engaged one with the other, and means interengaged between said key formations to lock said vertical members of said columns against relative lateral movement and said members each including a vertical flange laterally at right angles one to the other for supporting a side member end with said side member perpendicular thereto.

9. The invention as defined in claim 7, further characterized by pressure screw means in said top walls of said main beam sections bearing upon the upper sides of said arms to draw said bottom walls against the lower sides of said arms.

10. The invention as defined in claim 9, wherein said interengaged key formations are of L-shape in cross-section with one key formation in reverse relation to the other.

11. The invention as defined in claim 10, wherein said interengaged key formations have opposed vertically extending recesses forming a vertical passage, and a locking rod engaged in said passage.

12. The invention as defined in claim 9, wherein said interengaged key formations terminate in downwardly spaced relation to the upper ends of said flanges to form a seat for said beam ends.

13. In a shelter structure, four upright columns positioned at the four corners of a rectangle, horizontal side members extending between and supported at their ends by said columns, a pair of intersecting diagonal main beams respectively supported at their ends upon diagonally opposed pairs of said columns, auxiliary cantilever beams secured at their inner ends to and extending from the opposed sides of each of said main beams at intermediate points between its outer ends and its intersection with the other main beam, the upper sides of said auxiliary beams being in tension and their lower sides in compression, and each being connected at its outer end to and supporting one of said side members at its mid-point, horizontal members respectively extending from the intersection of said main beams to the mid-point of each of said side members, said main and auxiliary beams and said horizontal members defining an inner group of eight panel receiving openings, each in the shape of an isosceles triangle with said horizontal members forming the triangle bases, and said main and auxiliary beams and said side members defining an outer group of eight panel receiving openings, each in the shape of an isosceles triangle with said side members forming the triangle bases, a plurality of panels, each in the shape of an isosceles triangle disposed in and closing one of said openings, flange means carried by said horizontal members and side members for supporting the base edge margin of said panels horizontally, capping strip means removably secured to said horizontal members and side members for retaining said base edge margin on said flange means, flange means carried by said main and auxiliary beams for supporting the side edge margins of said panels with said panels inclined to form the sides of pyramidal formations having their apices at the junctions of said auxiliary beams and said main beams, and capping strip means removably secured to said main and auxiliary beams for retaining said side edge margins on said last mentioned flange means.

14. The invention as defined in claim 13, further characterized by means for securing said auxiliary beams to said main beams disposed in the space between said flange means and said capping strip means of said auxiliary and main beams.

15. The invention as defined in claim 13, further characterized by means for securing the inner ends of said horizontal members at the intersection of said main beams disposed in the space between said flange means and said capping strip means of said horizontal members and said main beams.

16. The invention as defined in claim 13, further characterized by means for securing the outer ends of said horizontal members to the outer ends of adjacent auxiliary beams disposed in the space between said flange means and said capping strip means of said horizontal members and said auxiliary beams.

17. The invention as defined in claim 13, wherein said capping strip means of said auxiliary beams, said horizontal members, and the parts of said main beams between their outer ends and the apices of said pyramidal formations each comprises a capping strip disposed over the member to which it is secured and has a panel engaging flange means extending at each side of said member.

18. The invention as defined in claim 13, further characterized by a longitudinal grooved formation and a sealing compound receiving channel carried by each of said side members and the parts of said main beams between their intersection and the apices of said pyramidal formation and wherein said capping strip means is secured by screws engaged in said grooved formation and has a sealing flange engaged in said channel.

19. In a shelter structure, four upright columns positioned at the four corners of a rectangle, horizontal side members extending between and supported at their ends by said columns, a pair of intersecting diagonal main beams respectively supported at their ends upon diagonally opposed pairs of said columns, horizontal members respectively extending from the intersection of said main beams to the mid-point of each of said side members, auxiliary cantilever beams secured at their inner ends to and extending from the opposed sides of each of said main beams at intermediate points between its outer ends and its intersection with the other main beam, the upper sides of said auxiliary beams being in tension and their lower sides in compression, and each being connected at its outer end to and supporting the outer end of one of said horizontal members, laterally engageable tongue slot means for respectively connecting the outer end of each said horizontal member to the mid-point of one of said side members, and a locking bar interengaged with said horizontal and side members to restrain lateral disengagement of said tongue and slot means.

20. The invention as defined in claim 6, wherein at least one of said side members includes panel receiving means at its opposite sides whereby said side member constitutes a common side member for adjacent shelter structures.

21. The invention as defined in claim 8, wherein the columns at the ends of at least one of said side members each includes a vertical member having vertical flanges at each of its edges in opposed spaced parallel relation to the flanges of a pair of companion vertical members with said companion vertical members in spaced parallel relation to each other for the support of the beam ends of diagonal main beams of adjacent shelter structures.

References Cited in the file of this patent

UNITED STATES PATENTS

| 845,350 | Gillespie | Feb. 26, 1907 |
| 1,959,880 | Sims | May 22, 1934 |
| 2,044,700 | Jones | June 16, 1936 |
| 2,433,677 | Thomas | Dec. 30, 1947 |

FOREIGN PATENTS

| 399,437 | Italy | Oct. 27, 1942 |
| 737,562 | Great Britain | Sept. 28, 1955 |